(12) United States Patent
Bakran et al.

(10) Patent No.: US 9,748,848 B2
(45) Date of Patent: Aug. 29, 2017

(54) MODULAR MULTILEVEL DC/DC CONVERTER FOR HVDC APPLICATIONS

(71) Applicant: SIEMENS AKTIENGESELLSCHAFT, Munich (DE)

(72) Inventors: Mark-Matthias Bakran, Erlangen (DE); Hans-Joachim Knaak, Erlangen (DE); Andre Schoen, Bayreuth (DE)

(73) Assignee: Siemens Aktiengesellschaft, Munich (DE)

( * ) Notice: Subject to any disclaimer, the term of this patent is extended or adjusted under 35 U.S.C. 154(b) by 28 days.

(21) Appl. No.: 14/434,861

(22) PCT Filed: Oct. 11, 2012

(86) PCT No.: PCT/EP2012/070203
§ 371 (c)(1),
(2) Date: Apr. 10, 2015

(87) PCT Pub. No.: WO2014/056540
PCT Pub. Date: Apr. 17, 2014

(65) Prior Publication Data
US 2015/0256081 A1 Sep. 10, 2015

(51) Int. Cl.
*H02M 3/28* (2006.01)
*H02M 7/483* (2007.01)
*H02M 3/335* (2006.01)

(52) U.S. Cl.
CPC ......... *H02M 3/28* (2013.01); *H02M 3/33584* (2013.01); *H02M 2007/4835* (2013.01)

(58) Field of Classification Search
CPC .... H02M 7/483; H02M 7/49; H02M 3/33507; H02M 7/4807; H02M 7/4826;
(Continued)

(56) References Cited

U.S. PATENT DOCUMENTS 3,942,089 A * 3/1976 Kanngiesser ....... H02M 7/7575
307/82
6,411,527 B1 6/2002 Reinold
(Continued)

FOREIGN PATENT DOCUMENTS

CN 101795072 A 8/2010
CN 102301576 A 12/2011
(Continued)

OTHER PUBLICATIONS

Knudsen L et al., "Description and Prospective Applications of New Multi-Terminal HVDC System Concepts", Cigre Conf. Internationale Des Grands Reseaux Elecriques, Aug. 26, 1990, pp. 1-11, Figures 4, 7a, 7b, 8, p. 4, right hand column, last paragraph, XP000770178.

*Primary Examiner* — Gustavo Rosario Benitez
(74) *Attorney, Agent, or Firm* — Laurence Greenberg; Werner Stemer; Ralph Locher

(57) ABSTRACT

A DC converter is suitable for continuous operation for connecting high-voltage DC networks having different voltages. The DC converter has a first partial converter and a second partial converter, which are connected in series with each other, forming a converter series circuit. The converter series circuit extends between the DC terminals of a DC connection. The second partial converter extends between the DC terminals of a second DC connection. The first partial converter and the second partial converter are connected to each other via a power exchange device, such that the exchange of electrical power between the first partial converter and the second partial converter is made possible via the power exchange device.

16 Claims, 12 Drawing Sheets

(58) Field of Classification Search
CPC ... H02M 2001/007; H02M 2001/0074; H02M 2001/0077; H02M 2001/008; H02M 2007/4835; H02M 3/28; H02M 3/33584
See application file for complete search history.

(56) References Cited

U.S. PATENT DOCUMENTS

| | | | |
|---|---|---|---|
| 6,519,169 | B1 | 2/2003 | Asplund et al. |
| 8,503,208 | B2 | 8/2013 | Krause |
| 8,837,176 | B2 | 9/2014 | Trainer et al. |
| 8,847,430 | B2 | 9/2014 | Juhlin |
| 8,861,234 | B2 | 10/2014 | Trainer et al. |
| 9,130,477 | B2 | 9/2015 | Marquardt |
| 2002/0024824 | A1* | 2/2002 | Reinold ............ H02M 3/28 363/17 |
| 2004/0246753 | A1* | 12/2004 | Kunow ............ H02M 3/285 363/65 |
| 2005/0047183 | A1* | 3/2005 | Kurio ............ H02M 3/3376 363/71 |
| 2005/0083716 | A1* | 4/2005 | Marquardt ............ H02M 5/271 363/132 |
| 2008/0252142 | A1* | 10/2008 | Davies ............ H02J 3/1864 307/42 |
| 2009/0021966 | A1* | 1/2009 | Jacobson ............ H02M 1/34 363/52 |
| 2009/0171521 | A1* | 7/2009 | Moki ............ B60L 11/18 701/22 |
| 2009/0290389 | A1* | 11/2009 | Ueno ............ H02M 3/337 363/21.02 |
| 2012/0127766 | A1* | 5/2012 | Crookes ............ H02J 3/1857 363/126 |
| 2012/0170338 | A1 | 7/2012 | Trainer et al. |
| 2012/0188803 | A1* | 7/2012 | Trainer ............ H02M 1/4233 363/37 |
| 2013/0119950 | A1* | 5/2013 | Nelson ............ H02J 3/1878 323/210 |
| 2013/0308235 | A1 | 11/2013 | Davies et al. |
| 2014/0375112 | A1* | 12/2014 | Werner ............ B29C 70/34 301/63.109 |

FOREIGN PATENT DOCUMENTS

| | | |
|---|---|---|
| CN | 102577066 A | 7/2012 |
| CN | 102640375 A | 8/2012 |
| EP | 1184963 A2 | 3/2002 |
| EP | 2458725 A1 | 5/2012 |
| EP | 2506415 A1 | 10/2012 |
| WO | 2010115452 A1 | 10/2010 |
| WO | 2010145690 A1 | 12/2010 |
| WO | 2011060812 A1 | 5/2011 |
| WO | 2012103936 A1 | 8/2012 |

\* cited by examiner

MODULAR MULTILEVEL DC/DC CONVERTER FOR HVDC APPLICATIONS

BACKGROUND OF THE INVENTION

Field of the Invention

The invention relates to a DC-to-DC voltage converter for connecting HVDC grids having different voltages, said DC-to-DC voltage converter having a first partial converter and a second partial converter which are connected in series with one another to form a converter series circuit, wherein the converter series circuit extends between the DC voltage terminals of a DC voltage connection and the second partial converter extends between the DC voltage terminals of a second DC voltage connection.

Such a device is known, for example, from WO 2010/145690 A1. That document discloses two partial converters which are connected in series with one another, wherein each partial converter has an individual phase module which consists of series-connected two-pole sub modules. The two-pole sub modules are equipped with power semiconductor switches and a capacitor, wherein, depending on the actuation of the power semiconductor switches, either the voltage dropping across the capacitor or a zero voltage can be generated at the output of each sub module. The series-connected phase modules form a first DC voltage connection, to which a first DC voltage grid can be connected. The second DC voltage connection is formed by the phase module of the second partial converter, wherein the negative pole of the first DC voltage connection is simultaneously the negative pole of the second DC voltage connection. An inherent drawback of the previously known device is that there exists the danger that the capacitors of the sub modules of the partial converters are charged above a permissible amount during continuous operation.

A device for load-flow control of DC voltage grids is described in WO 2010/115452. Said device has a longitudinal voltage source which is connected in series in a DC voltage line of said DC voltage grid. The longitudinal voltage source is realized by two series-connected line-fed converters, with the result that the losses during continuous operation are low. In order to be able to increase the voltage in the DC voltage grid, the converter which is connected in series in the DC voltage grid is connected on the AC voltage side via a first transformer, an AC voltage grid and a second transformer to the AC voltage connection of a converter which is connected in parallel with the DC voltage grid. The converter which is connected in parallel with the DC voltage grid can also be referred to as quadrature voltage source. The quadrature voltage source provides the energy required for supplying the longitudinal voltage source. In this way, load-flow control is made possible by increasing the voltage in the DC voltage grid.

Further prior art for connecting HVDC grids which are at different voltage levels is illustrated by way of example in FIG. 1. The DC voltage converter shown there has a first DC voltage connection 1, which forms a positive DC voltage terminal 2 and a negative DC voltage terminal 3, for connecting to the first HVDC grid. In order to connect to a second HVDC grid having a lower nominal DC voltage, a second DC voltage connection 4 is provided, which again has a positive DC voltage terminal 5 and a negative DC voltage terminal 6. Three phase modules 7 of a first partial converter 8 extend between the positive DC voltage terminal 2 of the DC voltage connection 1 and the negative connection terminal 3. In this case, a phase module consists of two mutually series-connected converter arms 9 and an inductance 10 in the form of coils. Furthermore, a second partial converter 11 is provided, which likewise has three phase modules 7 which are each composed of two series-connected converter arms 9 and an inductance 10. Each phase module 7 forms two DC voltage connections which form the positive connection terminal 5 and the negative connection terminal 6 of the second DC voltage connection 4. The potential point between the converter arms 9 forms an AC voltage phase 12 of an AC voltage connection 13 of the respective converter 8 or 11. The two AC voltage connections 13 are connected to one another via a three-phase transformer 14. In this case, the windings of said transformer 14 may be connected to one another in any way, that is to say, for example, in delta or star connection.

According to said previously known device, the DC voltage of the first DC voltage grid is firstly converted into an AC voltage via the first partial converter 8, transformed to the respectively required voltage level by the transformer 14 and subsequently converted back into the desired DC voltage again by the partial converter 11.

DC voltage converters for low to medium energies are likewise sufficiently known. Boost or buck converters which are equipped with coils and capacitors should be mentioned in this connection, wherein power semiconductor switches are used for temporary interruption of a flow of current. The power semiconductor switches of the known boost or buck converters would be loaded so heavily in the high-voltage range, however, that irreparable damage could already occur after a short amount of time.

BRIEF SUMMARY OF THE INVENTION

A problem addressed by the invention is to provide a DC voltage converter of the type mentioned at the outset which is also suitable for continuous operation.

The invention solves this problem in that the first partial converter and the second partial converter are connected to one another via power exchange means, with the result that the exchange of electric power between the first partial converter and the second partial converter via the power exchange means is made possible.

Within the scope of the invention, a DC-to-DC voltage converter is provided, which has a series circuit composed of two partial converters. Said converter series circuit forms two DC voltage connections which are each connected to a DC voltage terminal. This connection is made, for example, via a suitable inductance. The DC voltage terminals together form a first DC voltage connection to which a first DC voltage grid can be connected. A second DC voltage grid can be connected to the second DC voltage connection of the DC-to-DC voltage converter, with the result that the second DC voltage grid is connected to the DC voltage connections of a single partial converter. Since the dielectric strength of the series circuit of two partial converters is greater than the dielectric strength of a single partial converter of the series circuit, the first DC voltage grid can have an operating voltage which is greater than the operating voltage of the second DC voltage grid. The first DC voltage connection can therefore also be referred to as high-voltage side and the second DC voltage connection can be referred to as low-voltage side. Within the scope of the invention, it has been recognized that during continuous operation of the partial converters, electric power must be supplied or carried away. Apart from that, the power supplied to each partial converter must be equal to zero on average. However, this is not possible in practice. Therefore, according to the invention, power exchange means are provided, via which the two partial converters are likewise connected to one another. Thus, the partial converters can exchange electric power with one another, with the result that faults or failures of components can be avoided to the greatest extent within the scope of the invention, even during continuous operation of the DC-to-DC voltage converter. Excess power which drops across the first partial converter which extends between the positive DC voltage terminal of the first DC voltage connection and the positive DC voltage terminal of the second DC voltage connection is transferred to the low-voltage side according to the invention, that is to say to the second partial converter which extends between the DC voltage terminals of the second DC voltage connection, via the power exchange means. The second partial converter feeds said power into the DC voltage grid connected to the second DC voltage connection. Within the scope of the invention, a power flow is possible in both directions, that is to say from the high-voltage side to the low-voltage side or vice versa. Any translation ratios can also be realized within the scope of the invention.

The topology, that is to say the design and the components of the partial converters are, in principle, arbitrary within the scope of the invention. Expediently, however, the partial converters are self-commutated converters which are therefore equipped with power semiconductor switches which can be actively switched on and off. In contrast to this, only the second partial converter is a self-commutated converter. The converters advantageously have a series circuit composed of two-pole sub modules. The configuration of the sub modules is, in principle, arbitrary within the scope of the invention. Thus, a sub module has, for example, merely one power semiconductor switch, for instance a thyristor, GTO, IGBT, IGCT or the like, with which a freewheeling diode is connected back-to-back in parallel in the case of power semiconductor switches which can be switched off, for example. Alternatively, reverse-conducting power semiconductor switches are considered. A series circuit composed of said sub modules is necessary, since the dielectric strength of a single sub module is generally insufficient in order to be able to reliably accommodate the voltages dropping within the HVDC transmission. For this reason, each partial converter within the scope of the invention has a multiplicity of sub modules, for example approximately 100 or 300, which are connected in series. Moreover, the partial converters can also have inductive elements for limiting the maximum currents which can flow via the partial converters. Of course, snubber networks can also be provided within the context of the invention if power semiconductors which cannot be hardwired are used.

Advantageously, each partial converter has an AC voltage connection, wherein the AC voltage connection of the first partial converter is connected to the AC voltage connection of the second partial converter via the power exchange means. With this advantageous further development, the DC voltage of the DC voltage grids connected to the DC-to-DC voltage converter is converted into AC voltage, wherein the power exchange means convert the AC voltages into the required voltage level in a known manner.

Advantageously, the power exchange means are therefore designed as a transformer. The design of the transformer can, in principle, be arbitrary. Thus, conventional transformers with electrically isolated windings, which are expediently inductively coupled to one another, can be used. In contrast thereto, however, an autotransformer may also be used. In the case of an autotransformer, electrical isolation of the windings is dispensed with. Instead of a winding pair, merely one winding which has a tap is used. An autotransformer such as this can therefore also be considered as an inductive voltage divider. Means for isolating DC voltage potentials, for instance capacitors, are advantageously arranged between the autotransformer and the AC voltage connections of the partial converters.

Expediently, the transformer has a primary winding, which is connected to the AC voltage connection of the first partial converter, and a secondary winding, which is connected to the AC voltage connection of the second partial converter.

The AC voltage dropping in the primary winding is transformed to a lower AC voltage on the secondary side by a transformer such as this.

According to an advantageous further development, each partial converter has at least one phase module which forms two series-connected converter arms, wherein the potential point between the converter arms of a respective phase module forms an AC voltage phase of an AC voltage connection. According to this advantageous further development, converters are used which, for example, form converter arms or converter branches connected together to form a so-called Graetz bridge. In this case, each converter arm extends between a DC voltage connection and the AC voltage connection. By way of example, inductances in the form of inductor coils are arranged in the converter arm or the phase module. Partial converters with bridge circuits of this type are already known in HVDC transmission, and so recourse can be made to experience for the adaptation of the topology to the respective requirements.

In the case of one variant of the invention, each partial converter has three phase modules, the AC voltage connections of which are connected to one another via a three-phase transformer. The three-phase transformer therefore has three primary windings which are coupled to three secondary windings. The secondary windings and, respectively, the primary windings may be interconnected with one another in any way. Thus, for example, an earthed neutral point arrangement or a delta connection is possible within the scope of this further development of the invention.

In the case of a variant which differs herefrom, at least one partial converter has two phase modules, the AC voltage connection of which is coupled via a single-phase transformer to the AC voltage connection of the other partial converter. According to this advantageous further development, significant costs can be saved compared to the previously illustrated variant with a three-phase transformer. Thus, in this case only two phase modules are necessary for each partial converter. Instead of a three-phase transformer, a substantially more cost-effective single-phase transformer is used. The primary winding of said transformer has two connection terminals, wherein the one connection terminal is connected to the AC voltage phase of the first phase module and the other connection terminal is connected to the AC voltage phase of the second phase module of the first partial converter. A corresponding connection can also result for the second partial converter, with the result that its two phase modules are each connected on the AC-voltage side to a connection terminal of the secondary winding.

In the case of a further development relating hereto, each partial converter or at least one of the partial converters has in each case one phase module, the AC voltage phase of which is assigned to a capacitor auxiliary phase, which is connected to a pole of the first or second DC voltage connection via a capacitor, wherein said AC voltage phase and the capacitor auxiliary phase assigned thereto are connected to one another via a winding of a single-phase transformer. According to this variant of the invention, a connection terminal of the primary winding and a connection terminal of the secondary winding of the single-phase transformer are in each case connected to an AC voltage phase of the first partial converter or the second partial converter. The other connection terminal of the respective winding of the single-phase transformer is connected to the capacitor auxiliary phase. The capacitor auxiliary phase is connected via a capacitor or comparable capacitive means to a pole of the connected DC voltage grid or a terminal of a DC voltage connection. An auxiliary potential can therefore be generated by the capacitor auxiliary phase, with the result that the respective partial converter with its single phase module can generate an AC voltage at its AC voltage phase with reference to the potential of the capacitor auxiliary phase.

As has already been mentioned, it is expedient that, within the scope of the invention, at least one partial converter is a self-commutated converter which has power semiconductor switches which can be switched on and off. According to a preferred variant, both the first partial converter and the second partial converter are each a self-commutated converter. In contrast thereto, the first partial converter is an externally commutated converter which has thyristors, for example, which can be switched on but not off.

According to a preferred configuration of the invention, both the first partial converter and the second partial converter or one of the two partial converters are configured as a so-called modular multi-level converter which has converter arms having a series circuit composed of two-pole sub modules, wherein each sub module is equipped with at least one energy store and power semiconductor switches. The power semiconductor switches are so-called power semiconductor switches which can be switched on and off. In this case, a freewheeling diode is expediently connected back-to-back in parallel with each of the power semiconductor switches which can be switched off. In contrast thereto, however, reverse-conducting power semiconductor switches can also be used.

Sub modules such as this can form, for example, a so-called full-bridge circuit and/or a half-bridge circuit.

A half-bridge circuit has a series circuit composed of two power semiconductor switches, which series circuit is connected in parallel with an energy store. One connection terminal of the sub module is connected to one pole of the energy store and the other connection terminal of the sub module is connected to the potential point between the power semiconductor switches.

A full-bridge circuit has two such series circuits which are both connected in parallel with the capacitor or the energy store of the sub module. In the case of a full-bridge circuit, the first connection terminal is connected to the potential point between the power semiconductor switches of the first series circuit and the second connection terminal is connected to the potential point between the power semiconductor switches of the second series circuit.

Furthermore, the sub modules can also form a so-called double-module circuit, which is disclosed in WO 2011/067120, for example, and the design of which is discussed in more detail below. Sub modules with full-bridge or double-module circuits are bidirectionally blocking sub modules.

According to another configuration of the invention, each converter arm of the first partial converter has both bidirectionally blocking sub modules and sub modules with half-bridge circuits. A sub module in half-bridge circuit has the advantage compared to a sub module in full-bridge circuit or double-module circuit that the losses are reduced owing to the lower number of power semiconductor switches—two compared to four power semiconductor switches. Of course, half-bridge circuits are also more cost-effective than full-bridge circuits. Full-bridge circuits and double-module circuits have the advantage, however, that the flow of current can be controlled in both directions via the respective sub module. In contrast, in the case of a half-bridge circuit, a short-circuit current can flow unhindered via the freewheeling diode arranged between the first and second connection terminals. Like sub modules in full-bridge circuits, sub modules in double-module circuits can also control the flow of current in both directions. The mixed use of full-bridge and half-bridge sub modules or double modules and half-bridge modules represents a compromise between low losses and costs and, at the same time, protection against, for example, high short-circuit currents which can be prevented from flowing through the DC-to-DC voltage converter by appropriate actuation of the full-bridge sub modules. According to this advantageous further development, a DC-to-DC voltage converter which prevents a short-circuit current from flowing from the one DC voltage grid into the other DC voltage grid is thus provided. According to a further development, the second partial converter has phase modules which consist exclusively of a half-bridge circuit, wherein the translation ratio ü is greater than or equal to 2. A DC-to-DC voltage converter such as this can reliably isolate a short circuit in the DC voltage grid which is arranged at the second DC voltage connection.

Further expedient configurations and advantages of the invention are the subject matter of the following description of exemplary embodiments of the invention with reference to the figures of the drawing, wherein identical reference signs refer to identically acting components and wherein:

DESCRIPTION OF THE INVENTION

Figure 1:
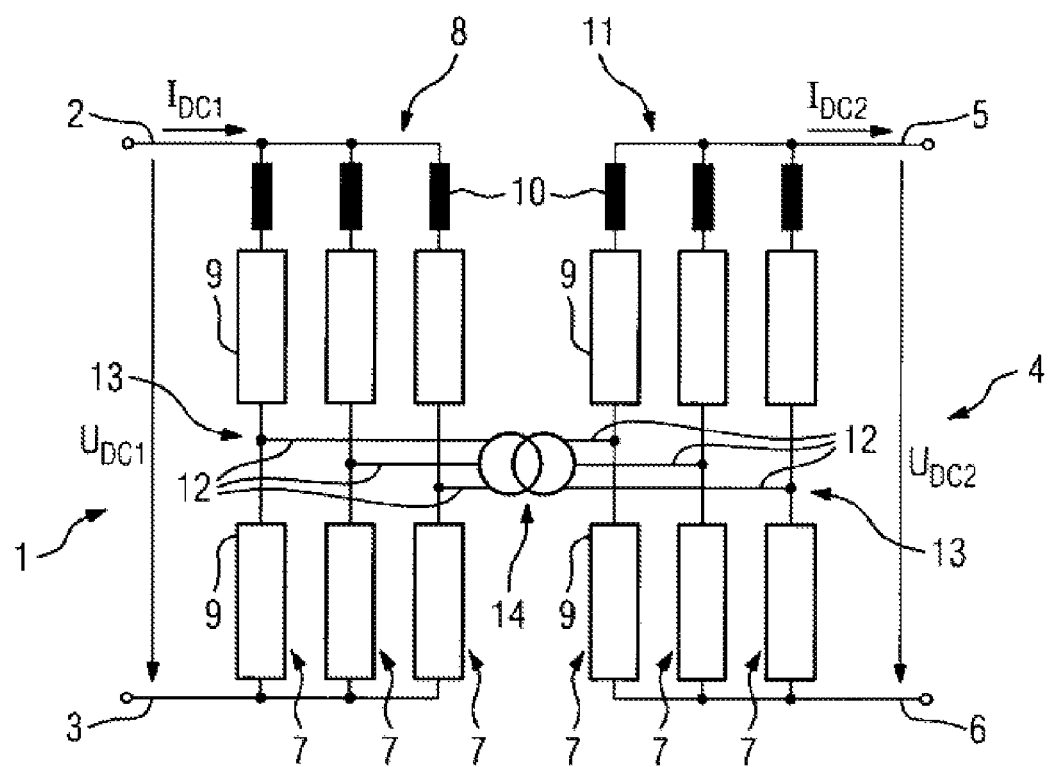
FIG. 1 shows an equivalent circuit diagram of a DC-to-DC voltage converter according to the prior art.

FIG. 1 shows an equivalent circuit diagram of a DC-to-DC voltage converter according to the prior art, which has already been described at the outset.

Figure 2:
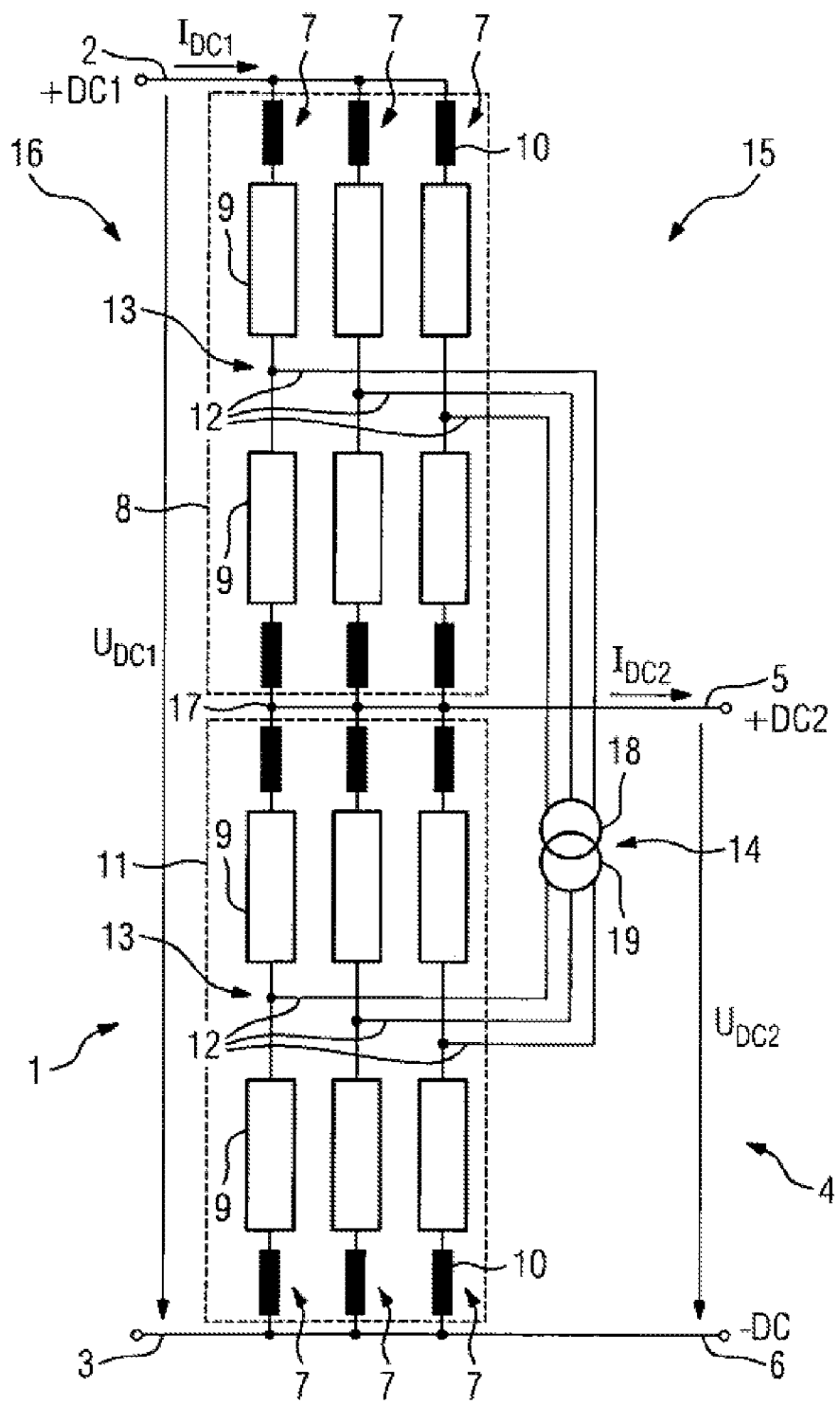
FIG. 2 shows an equivalent circuit diagram of an exemplary embodiment of the DC-to-DC voltage converter according to the invention.

FIG. 2 shows an equivalent circuit diagram of an exemplary embodiment of a DC-to-DC voltage converter 15 according to the invention, which has a first DC voltage connection 1 with a positive DC voltage terminal 2 and a negative DC voltage terminal 3. Furthermore, a second DC voltage connection 4 with a positive DC voltage terminal 5 and a negative DC voltage terminal 6 is provided. The DC voltage terminal 6 is at the same potential as the DC voltage terminal 3 of the first DC voltage connection 1. The DC-to-DC voltage converter 15 shown also comprises a first partial converter 8 and a second partial converter 11 which are connected in series with one another and form a converter series circuit 16, wherein the first partial converter 8 is connected on the DC-voltage side via inductances 10 to the positive DC voltage terminal 2 of the first DC voltage connection 1 and to the positive DC voltage terminal 5 of the second DC voltage connection 4. The second partial converter 11 is likewise connected on the DC-voltage side via inductances 10 to the positive DC voltage terminal 5 of the second DC voltage connection 4 and to the negative DC voltage terminal 3 of the first DC voltage connection 1. The converter series circuit 16 extends between the DC voltage terminals 2, 3 of the first DC voltage connection 1. The second partial converter 11 with its phase modules 7 extends between the DC voltage terminals 5, 6 of the second DC voltage connection 4. Each phase module comprises two inductances 10 in the form of coils.

The inductances 10 are in this case considered to be components of the phase module 7 and therefore of the partial converter 8 or 11. The first DC voltage terminal 1 is used to connect a first DC voltage grid having the nominal DC voltage $U_{DC1}$. The second DC voltage connection is used to connect a second DC voltage grid having the nominal DC voltage $U_{DC2}$. The nominal DC voltage $U_{DC1}$ of the first DC voltage grid in this case is three times as high as the nominal DC voltage $U_{DC2}$ of the second DC voltage grid ($U_{DC1}=3*U_{DC2}$). The translation ratio ü of the DC-to-DC voltage converter 15 is therefore equal to 3. During operating of the DC-to-DC voltage converter 15, the voltage of the second DC voltage grid thus drops across the second partial converter 11. The positive DC voltage terminal 5 of the second DC voltage connection 4 is at the DC voltage potential point 17 between the first partial converter 8 and the second partial converter 11.

The topology of the first partial converter 8 may substantially correspond to the topology of the second partial converter 11. However, in order to be able to block short circuits in the first DC voltage grid and, at the same time, to be able to operate with losses which are as low as possible, the design of the partial converters differs from one another in a preferred variant of the invention.

In FIG. 2, the first partial converter 8 and the second partial converter 11 comprise in each case three phase modules 7, wherein each phase module has a series circuit composed of converter arms 9.

The potential point between the converter arms 9 of a phase module 7 corresponds to an AC voltage phase 12 of an AC voltage connection 13 of the first partial converter 8 or second partial converter 11. In this case, the AC voltage phases 12 of the first partial converter 8 are in each case electrically connected to a primary winding 18 of a three-phase transformer 14 as power exchange means. In contrast, the AC voltage phases 12 of the AC voltage connection 13 of the second partial converter 11 are connected to the secondary winding 19 of the transformer 14. Owing to the inductive coupling of the windings 18, 19, an exchange of power between the first partial converter 8 and the second partial converter 11 is made possible. In this connection, the partial converters 8 and 11 are actuated such that a power flow is established from the first partial converter 8 to the second partial converter 11, which power flow then introduces the power into the DC voltage grid present at the second DC voltage connection 4.

Figure 10:
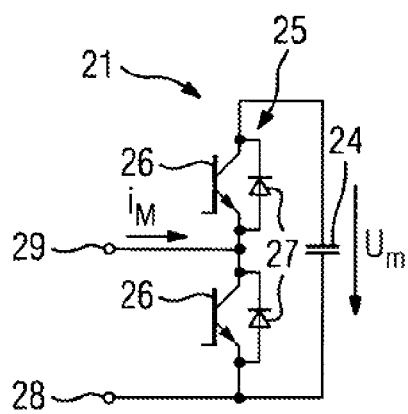
FIGS. 10 to 12 show equivalent circuit diagrams of sub modules for a DC-to-DC voltage converter according to the invention.
Figure 11:
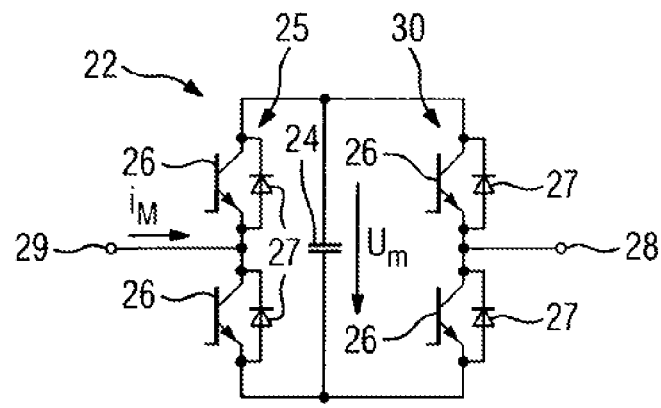
Figure 12:
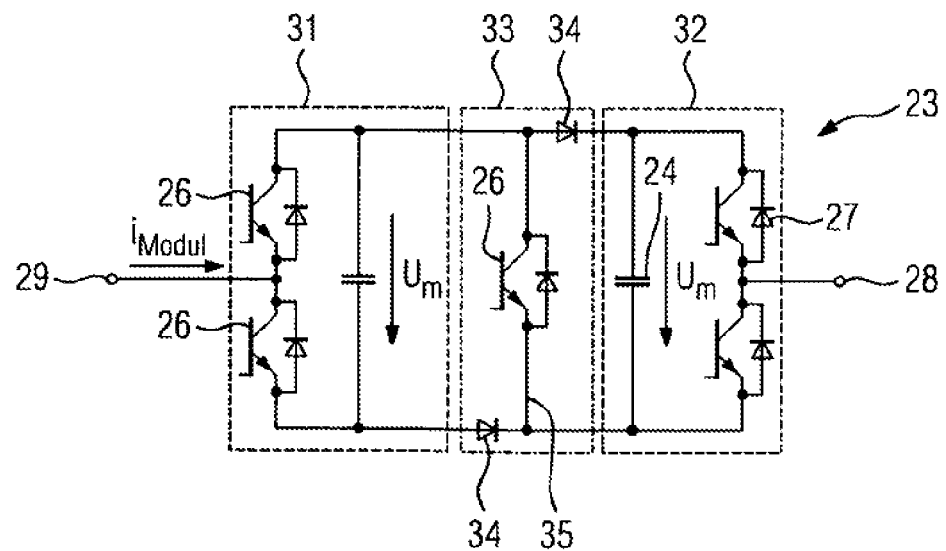
Figure 13:
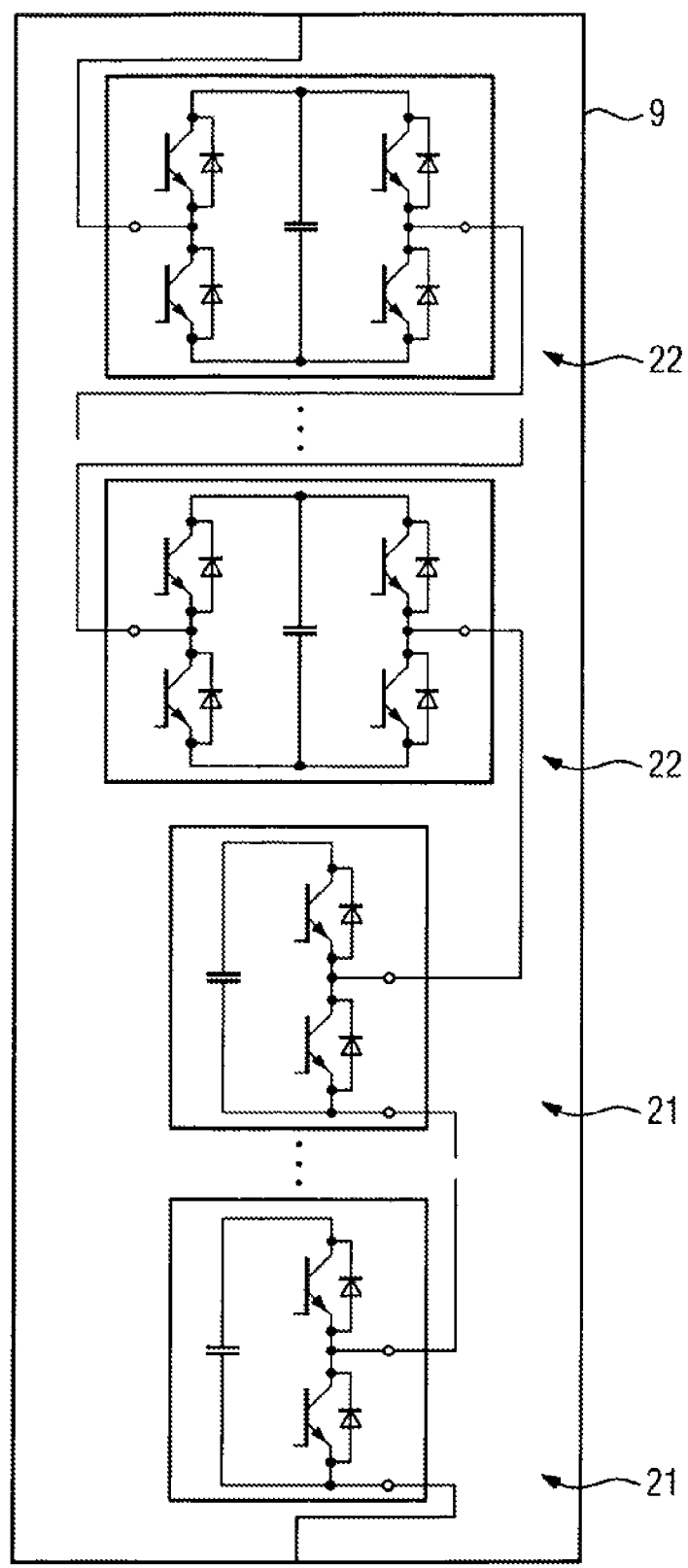
FIG. 13 shows an exemplary embodiment of a converter arm for a DC-to-DC voltage converter according to the invention.

In the exemplary embodiment shown in FIG. 2, the partial converters 8 and 11 are each so-called modular multi-level converters with converter arms 9 which are interconnected to form a so-called Graetz bridge. In this case, each converter arm 9 has a series circuit composed of two-pole sub modules, which are illustrated by way of example in FIGS. 10 to 12. The converter arms 9 of the partial converter 8 are illustrated in FIG. 13. It can be seen there that each converter arm 9 has a series circuit composed of different two-pole sub modules 20 and 21, the design of which is illustrated in FIGS. 10 and 11. FIG. 12 shows another configuration of a sub module 23 which may be part of a series circuit of a converter arm 9 within the scope of the invention to be used in a DC-to-DC voltage converter 15 according to the invention.

The sub module 21 illustrated in FIG. 10 is a so-called half-bridge circuit. It can be seen that said sub module 21 has an energy store 24 in the form of a unipolar capacitor 24. A series circuit 25 composed of two power semiconductor switches 26, in this case IGBTs, is connected in parallel with the capacitor 24, wherein a freewheeling diode 27 is connected back-to-back in parallel with each IGBT 26. A first sub module connection terminal 28 of the sub module 21 is connected to a pole of the capacitor 24, while a second sub module connection terminal 29 is connected to the potential point between the IGBTs 26. Depending on the actuation of the power semiconductor switches 26, the voltage $U_m$ dropping across the capacitor 24 or a zero voltage can be generated.

FIG. 11 shows another exemplary embodiment of a sub module 22 which likewise has an energy store 24 in the form of a capacitor across which a unipolar voltage $U_m$ drops. In this case, too, a first series circuit 25 composed of two IGBTs 26 is provided, wherein a freewheeling diode 27 is again connected back-to-back in parallel with each IGBT 26. Furthermore, a second series circuit 30 is also provided, however, which second series circuit is likewise connected in parallel with the capacitor 24. The second series circuit 30 also has two series-connected IGBTs 26 which in each case have a freewheeling diode 27 connected back-to-back in parallel therewith. The first sub module connection terminal 29 is again connected to the potential point between the IGBTs 26 of the first series circuit 25, wherein the potential point between the IGBTs 26 of the second series circuit 30 forms the second connection terminal 28. With a full-bridge circuit, the voltage $U_m$ dropping across the energy store 24, a zero voltage or the inverse capacitor voltage $-U_m$ can be generated at the two connection terminals 26 and 28.

Furthermore, it is possible with the full-bridge circuit 22 according to FIG. 11 for the flow of current between the connection terminals 26 and 28 to be controlled in a targeted manner in both directions. In other words, in the event of a short circuit an opposing potential can be built up in both directions using a full-bridge module 22, which opposing potential can be used to suppress the short-circuit current. In the case of a sub module 21 according to FIG. 10, which is therefore realized as half-bridge circuit, at a corresponding polarity, current can flow from the sub module connection terminal 28 via the lower freewheeling diode 27 into the sub module connection terminal 29 without it being possible to actively interrupt this. A short-circuit current in this direction can therefore not be influenced. In contrast, however, the half-bridge circuit has the advantage that it requires only two IGBTs and two freewheeling diodes for its design and is thus substantially more cost-effective to produce than the full-bridge circuit according to FIG. 11. Furthermore, the losses of the half-bridge circuit 21 are lower.

A compromise between the two configurations, that is to say the half-bridge and full-bridge circuit, is illustrated by the sub module 23 shown in FIG. 12, which is also known as a so-called double-module circuit. The double-module circuit 23 is described in detail in WO 2011/067120 and consists of two identical subunits 31 and 32, the topology of which is based on that of a half-bridge circuit. The subunits 31 and 32 each comprise an energy store 24 in the form of a capacitor and a series circuit 25 composed of two IGBTs 26 each with a freewheeling diode 27 connected back-to-back in parallel. Alternatively, reverse-conducting power semiconductors are considered. A first sub module connection terminal 28 is connected to the potential point between the IGBTs 26 of the first subunit 32, while the second sub module connection terminal 29 is connected to the potential point of the IGBTs 26 of the second subunit 31. The two subunits 31 and 32 are connected to one another via connection means 33, wherein the connection means have potential isolation diodes 34 and a further IGBT 26 in a center branch 35, which connects the cathode of the lower potential isolation diode 34 to the anode of the upper potential isolation diode 34. Said sub module 23 can generate the same voltages at its sub module connection terminals 18, 19 as two series-connected half-bridge circuits 21 according to FIG. 10, wherein the connection means 33 ensure, however, that an opposing potential can be built up against short-circuit currents in both directions. Thus, short-circuit currents which want to flow in both directions via the connection terminals 28 and 29 are reduced in a targeted manner or even suppressed. More detail about this property will be given below.

Again with reference to FIG. 2, depending on the actuation of the sub modules 21, 22 or 23, the voltage dropping between the respective DC voltage connection 2, 5, 3 and the respective AC voltage connection 13 can thus be varied in steps. Thus, an AC voltage can be generated at the AC voltage connection 13 of a respective partial converter 8 or 11.

Figure 3:
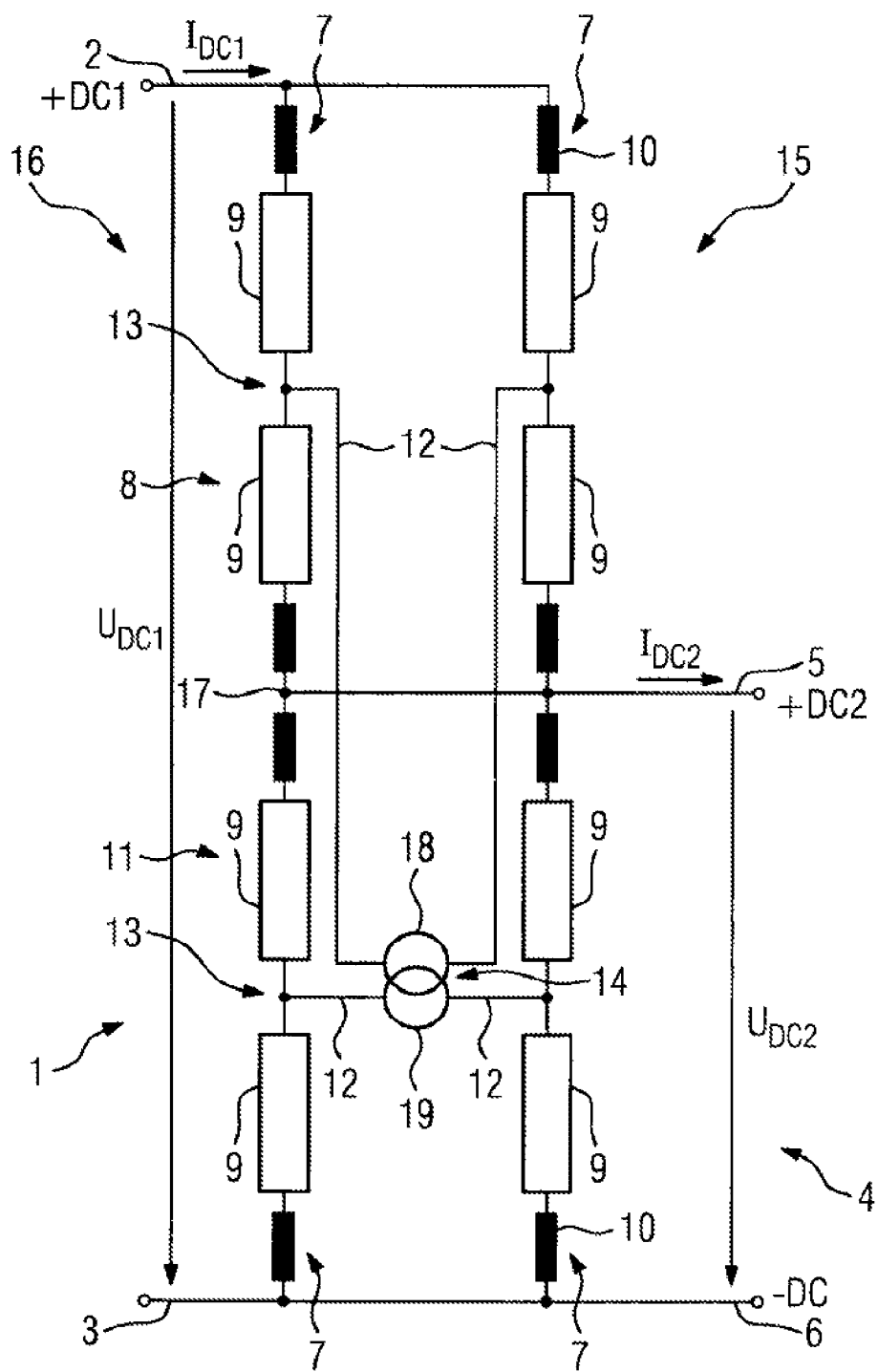
FIGS. 3 to 7 show further exemplary embodiments of the DC-to-DC voltage converter according to the invention.

FIG. 3 shows another exemplary embodiment of the DC-to-DC voltage converter 15 according to the invention with a converter series circuit 16 composed of two partial converters 8 and 11, wherein each of the partial converters 8 and 11 has two phase modules 7 which in each case comprise a series circuit composed of two converter arms 9 and two inductances 10. The second partial converter 11 is arranged between the DC voltage terminals 5, 6 of the second DC voltage connection 4 and the converter series circuit 16 is arranged between the terminals 2, 3 of the first DC voltage connection 1. In this case, the first partial converter 8 extends—as in FIG. 2—between the positive DC voltage terminal 2 of the first DC voltage connection 1 and the positive DC voltage terminal 5 of the second DC voltage connection 4. The converter arms 9 correspond in their design to the converter arms 9 already acknowledged in connection with FIG. 2. Owing to the reduced number of phase modules 7, only a single-phase transformer 14 with a single primary winding 18 and a single secondary winding 19 is provided in the case of the exemplary embodiment according to FIG. 3. The primary winding 18 has two transformer connection terminals, wherein a transformer connection terminal is connected to the AC voltage phase 12 of the first phase module 7 of the first partial converter 8 and the other transformer connection terminal is connected to the AC voltage phase 12 of the second sub module 7 of the first partial converter 8. A corresponding connection results for the secondary winding 19 with its two transformer connection terminals, wherein one of the transformer connection terminals is connected to the AC voltage phase 12 of the first phase module 7 of the second partial converter and the other transformer connection terminal is connected to the AC voltage phase 12 of the second phase module 7 of the second partial converter 11. Owing to said two-phase or single-phase configuration, the DC-to-DC voltage converter 15 according to FIG. 3 is substantially more cost-effective in comparison to that shown in FIG. 2, wherein the maximum power flow in the case of the DC-to-DC voltage converter 15 according to FIG. 3 is reduced, however.

Figure 4:
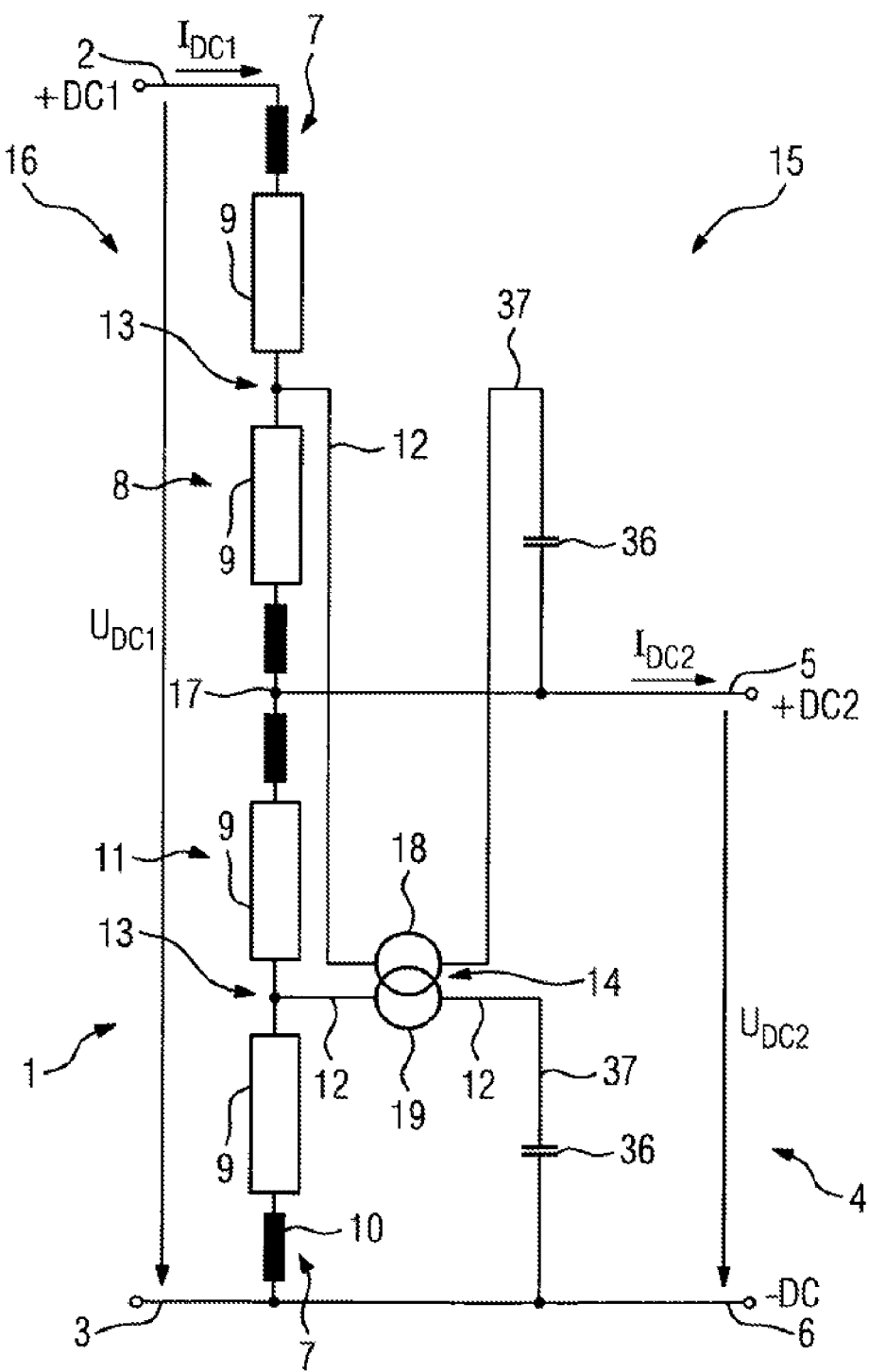

FIG. 4 shows another exemplary embodiment of the DC-to-DC voltage converter 15 according to the invention, which differs from the DC-to-DC voltage converter 15 shown in FIG. 3 in that each of the partial converters 8 and 11 has only one phase module 7. Instead of a second phase module, each partial converter 8 and 11 has a capacitor 36 which is connected to the positive DC voltage terminal 5 of the second DC voltage connection 4 and to the two DC voltage connections with a common negative DC voltage terminal 3, 6, wherein the other pole of the respective capacitor 36 forms a capacitor auxiliary phase 37 which is permanently assigned to AC voltage phase 12 of the respective partial converter 8 or 11 to the effect that the transformer connection terminal of the primary winding 18 is connected to the AC voltage phase 12 of the first partial converter 8 and the other transformer connection terminal of the primary winding 18 is connected to the capacitor auxiliary phase of the first partial converter 8. The same correspondingly applies to the second partial converter 11 and the secondary winding 19 of the single-phase transformer 14. The costs of the DC-to-DC voltage converter 15 according to FIG. 4 could be reduced even further in comparison with the one shown in FIG. 3.

Figure 5:
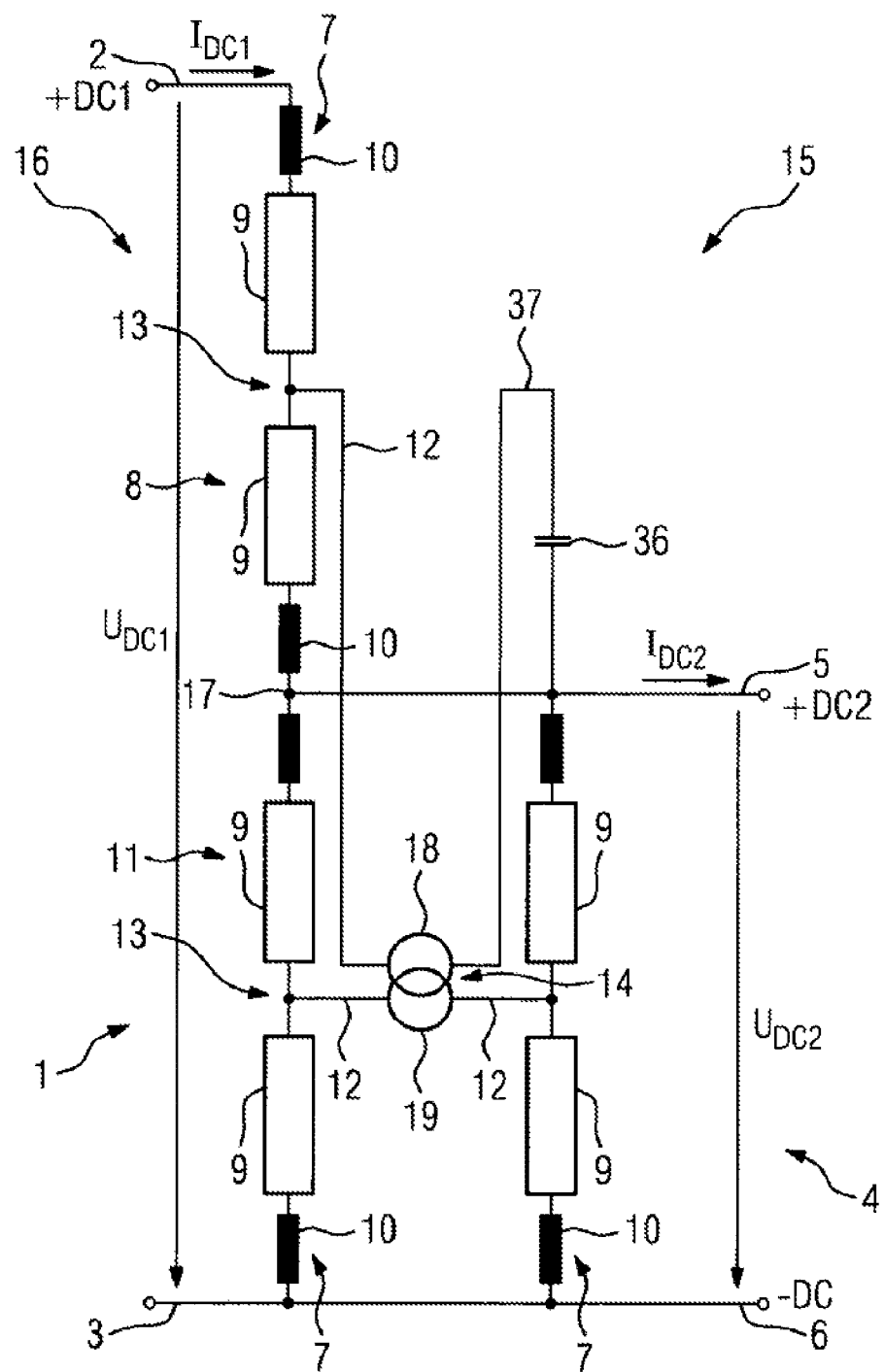

FIG. 5 shows another exemplary embodiment of the DC-to-DC voltage converter 15 according to the invention which differs from the exemplary embodiment shown in FIG. 4 to the extent that only the first partial converter 8 forms a capacitor auxiliary phase 37 by means of a capacitor 36 which is connected to the positive DC voltage terminal 5 of the second DC voltage connection 4. In contrast, the second partial converter 11—like that second partial converter 11 shown in FIG. 3—has two phase modules 7 with two AC voltage phases 12, which are each connected to a transformer connection terminal of the secondary winding.

Figure 6:
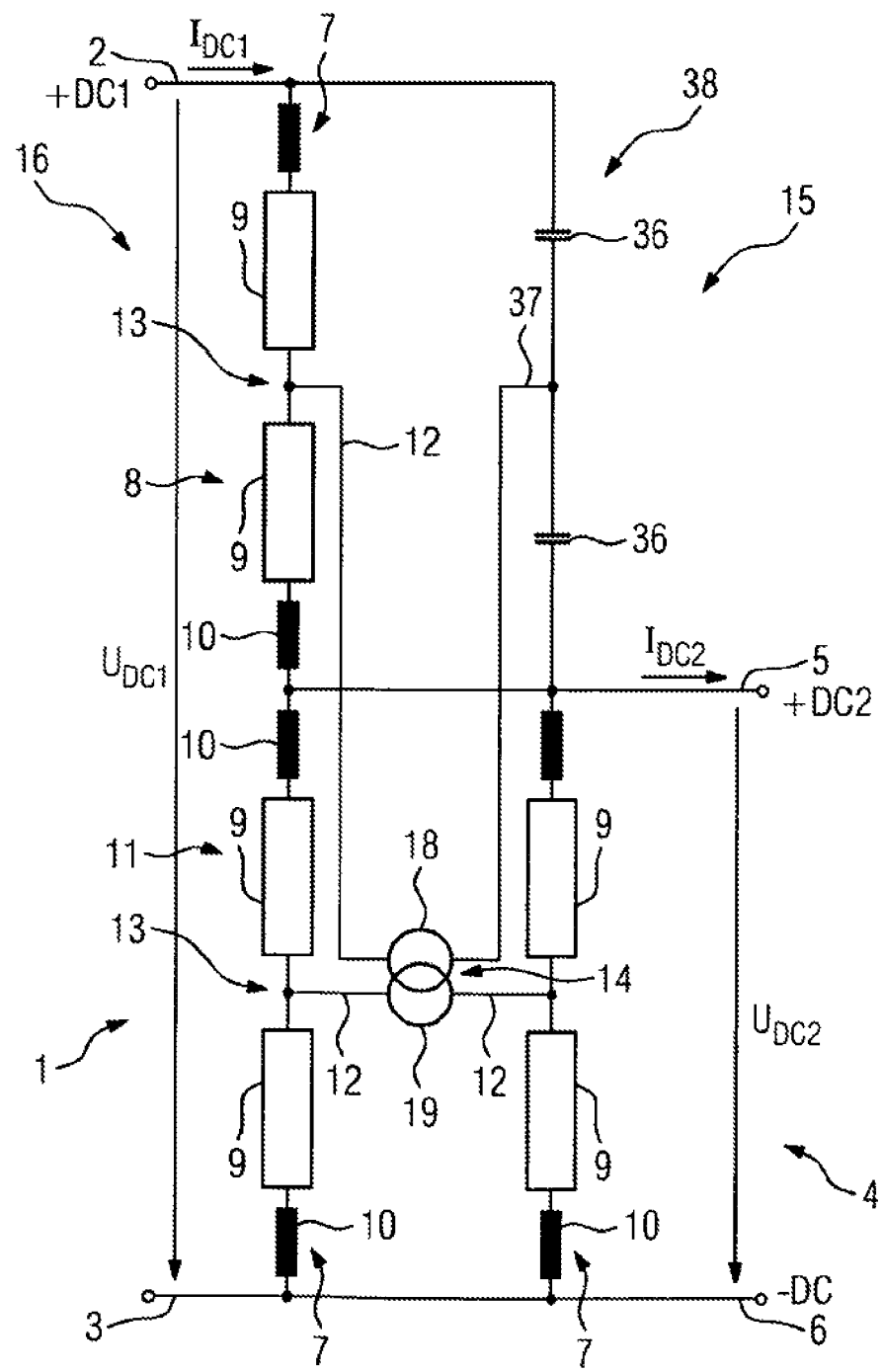

FIG. 6 shows another exemplary embodiment of the DC-to-DC voltage converter 15 according to the invention, wherein the second partial converter 11—like that partial converter 11 shown in FIG. 5—has two phase modules 7 with two AC voltage phases 12. However, the first partial converter 8 has two capacitors 36 which are connected in series with one another to form a capacitor series circuit 38. The capacitor series circuit 38 thus extends between the positive DC voltage terminal 2 of the first DC voltage connection 1 and the positive DC voltage terminal 5 of the second DC voltage connection 4. Thus, the capacitor series circuit 38 is connected in parallel with the phase module 7 including the inductances 10 of the first partial converter 8. The potential point between the capacitors 36 of the capacitor series circuit 38 again forms a capacitor auxiliary phase 37 which—as has already been mentioned in connection with FIGS. 4 and 5—is connected to a transformer connection terminal of the primary winding 18 of the transformer 14. By using two capacitors 36, the potential of the capacitor auxiliary phase 37 can be adjusted more stably.

Figure 7:
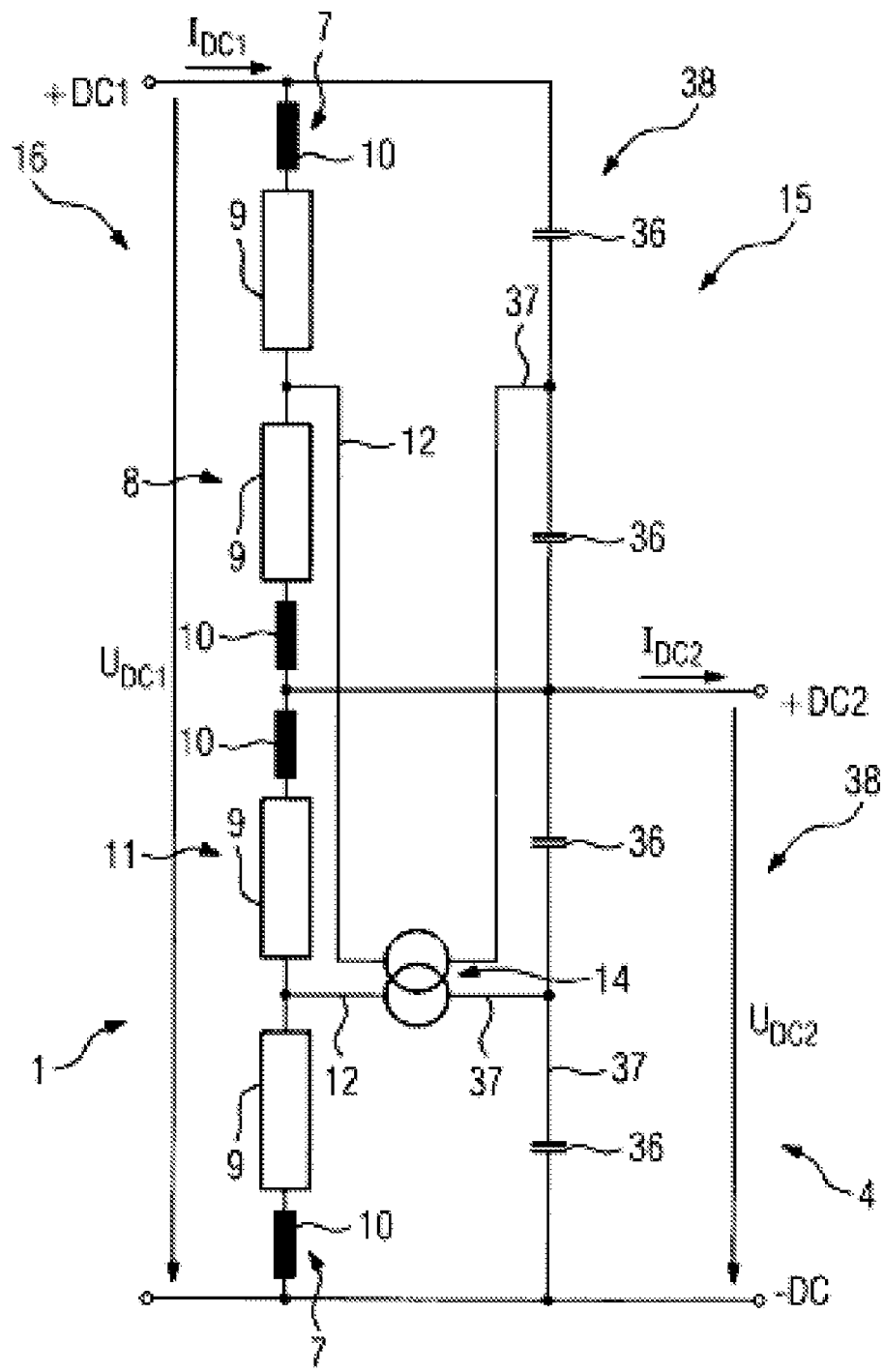

FIG. 7 shows another exemplary embodiment of the DC-to-DC voltage converter according to the invention, wherein, however, the second partial converter 11 also has a capacitor series circuit 38 instead of a second phase module 7 as in FIG. 6, which capacitor series circuit is connected in parallel with the phase module 7 including inductance 10. Thus, the second partial converter 11 also forms a capacitor auxiliary phase 37, the potential of which is determined by a series circuit composed of two capacitors 36.

Figure 8:
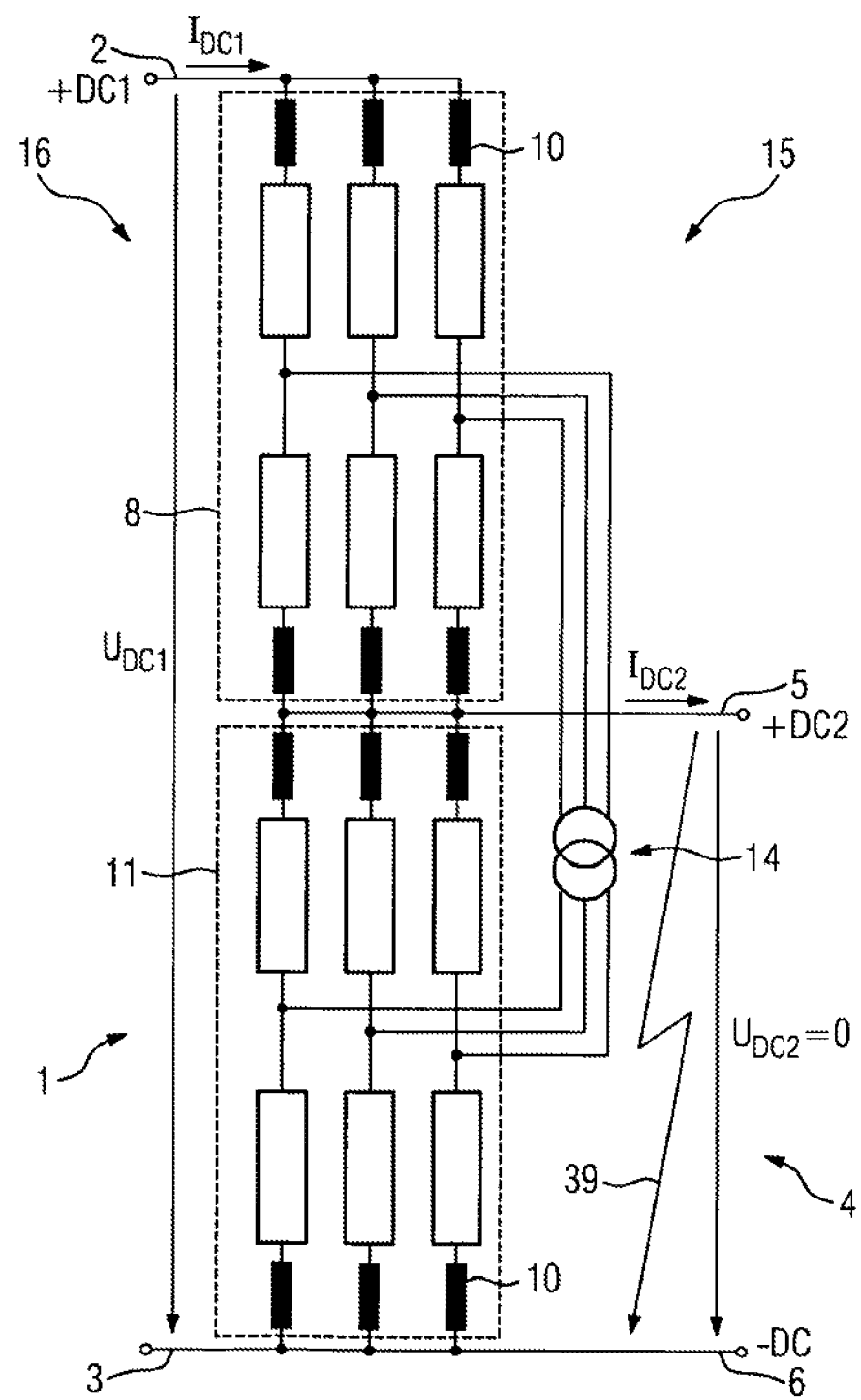
FIG. 8 shows the DC-to-DC voltage converter according to FIG. 2, which is set up to block a short-circuit current at the second DC voltage connection.
Figure 9:
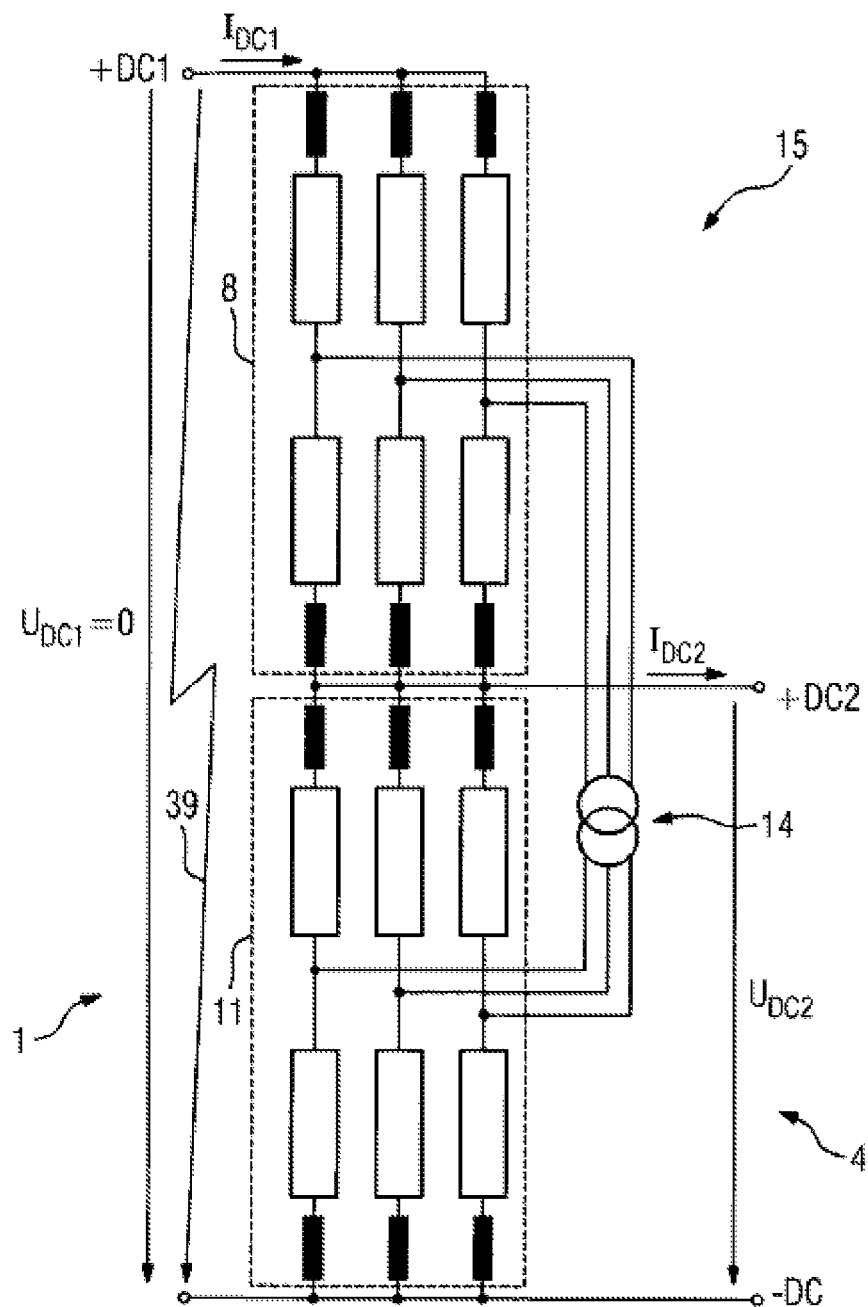
FIG. 9 shows the DC-to-DC voltage converter up at the first DC voltage connection to block a short-circuit current.

FIGS. 8 and 9 illustrate the mode of operation of the DC-to-DC voltage converter according to FIG. 2, wherein the first partial converter 8 thereof has converter arms 9 according to FIG. 13. In contrast, the converter arms 9 of the second partial converter 11 are exclusively realized by sub modules 21 in half-bridge circuit according to FIG. 10. Therefore, the first partial converter 8 differs from the second partial converter 11 in that its converter arms 9 have both sub modules 22 in full-bridge circuit according to FIG. 11 and sub modules 21 in half-bridge circuit according to FIG. 10. As has already been mentioned, the full-bridge circuit is bidirectionally blocking, that is to say can disconnect in a targeted manner currents flowing in both directions via its connection terminals 28 and 29.

As has already been explained, according to the invention, the first DC voltage connection 1 is provided for connecting a first DC voltage grid having the nominal voltage $U_{DC1}$. The second DC voltage connection 4 is used to connect a second DC voltage grid having the nominal voltage $U_{DC2}$. In this case, according to the invention, the DC voltage connection 1 forms the high-voltage side, while the second DC voltage connection 4 can also be referred to as low-voltage side. In the exemplary embodiment shown in FIG. 8, a short circuit 39 is present in the second DC voltage grid, that is to say on the low-voltage side and thus at the second DC voltage connection 4, with the result that the voltage $U_{DC2}$ dropping at the second DC voltage connection 4 is equal to zero. The DC-to-DC voltage converter 5 can isolate the short-circuit at the low-voltage side if the voltage $U_{DC1}$ at the high-voltage side, that is to say the nominal voltage, at the first DC voltage connection 1 is greater than or equal to twice the DC voltage $U_{DC2}$ at the second DC voltage connection 4. This results from the following consideration: if the voltage dropping across the first partial converter 8 is $U_{up}$, said voltage results from the difference in the nominal voltages of the connected grids according to $$U_{up} = U_{DC1} - U_{DC2}.$$

If the translation ratio ü is defined as $$\bar{u} = \frac{U_{DC1}}{U_{DC2}},$$

the following results:

$$U_{up} = U_{DC1}\left(1 - \frac{1}{\bar{u}}\right) = U_{DC3}\left(\frac{\bar{u}-1}{\bar{u}}\right).$$

Consequently, for ü≥2, each converter arm 9 of the first partial converter 8 can block half the voltage $U_{DC1}$. Thus, two converter arms 9 in series can block the total voltage $U_{DC1}$.

FIG. 9 shows a short-circuit 39 at the high-voltage side, that is to say in the first DC voltage grid, which is present at the DC voltage connection 1. In order to be able to achieve effective isolation of the high-voltage side, a sufficient number of bidirectionally blocking sub modules 22 or 23 according to FIG. 11 or 12 must be present in the first partial converter 8 in order to be able to completely accommodate the voltage of the low-voltage side. If $U_m$ is the maximum voltage which each sub module 22 or 23 can block, then the necessary number $n_{VB}$ of bidirectionally blocking sub modules 22 or 23 in a converter arm 9 of the first partial current converter 8 is given by:

$$n_{VB} = \frac{U_{DC2}}{2U_m}.$$

For the number of half-bridge modules in a converter arm 9 of the first partial converter 8, the following results:

$$n_{HB} = \frac{U_{DC1} - U_{DC2}}{U_m} - \frac{U_{DC2}}{2U_m} = \frac{2U_{DC1} - 3U_{DC2}}{2U_m} = \frac{U_{DC1}}{U_m}\left(\frac{2\bar{u}-3}{2\bar{u}}\right).$$

If the conditions specified on the basis of the translation ratio ü are complied with, short-circuit currents can be reliably blocked on both sides of the DC-to-DC voltage converter.

Figure 14:
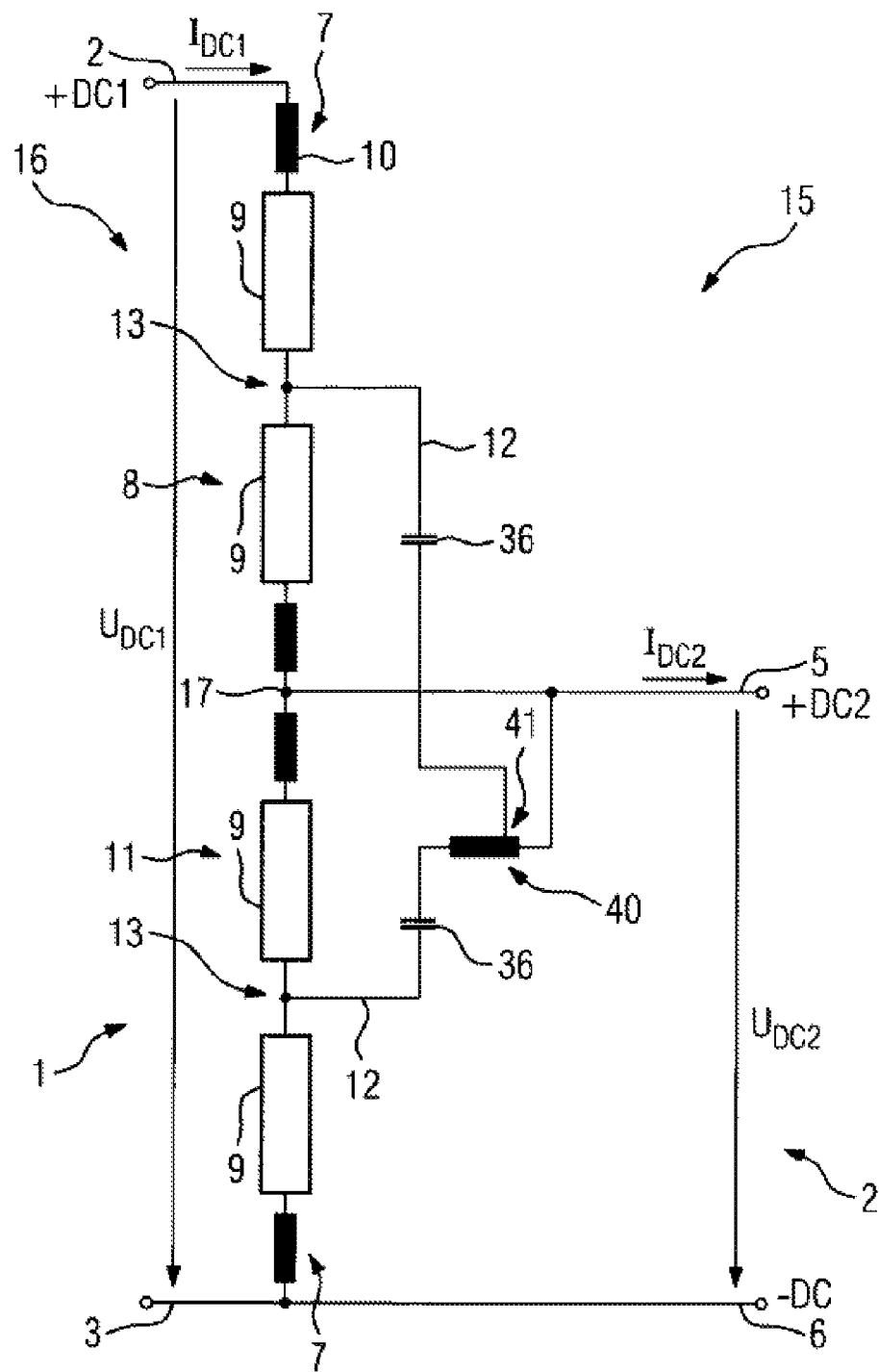
FIG. 14 shows a further exemplary embodiment of the DC-to-DC voltage converter according to the invention.

FIG. 14 shows another variant of the invention. The DC-to-DC voltage converter 15 shown there again has two partial converters 8, 11 which are connected in series to form a converter series circuit 16. Each partial converter 8, 11 has a single phase module 7 which has two converter arms 9 and an AC voltage connection 13 having an AC voltage phase 12, which is arranged between the converter arms 9. An autotransformer 40 is provided as power exchange means. The autotransformer 40 has only a single winding with one tap 41. An end-side transformer connection terminal of the autotransformer 40 is connected to the positive DC voltage connection terminal 5 of the DC voltage connection 4. The other end-side transformer connection terminal and the tap 41 are each connected via a capacitor 36 to the AC voltage connection 13 of the first or, respectively, second partial converter 11. The two capacitors 36 are used here as means for isolating the DC voltage potentials of the partial converters 8 and 11.

The invention claimed is:

1. A DC-to-DC voltage converter for connecting HVDC grids having different voltages carried on first DC voltage terminals and on second DC voltage terminals, respectively, the DC-to-DC voltage converter comprising:
   a first partial converter and a second partial converter connected in series with one another to form a converter series circuit;
   said converter series circuit extending between the first DC voltage terminals carrying a first DC voltage and said second partial converter extending between the second DC voltage terminals carrying a second DC voltage; and
   a power exchange device connecting said first partial converter and said second partial converter to one another for enabling an exchange of electric power between said first partial converter and said second partial converter via said power exchange device;
   wherein at least one of said first and second partial converters is a self-commutated converter having a power semiconductor switch to be selectively switched on and off;

and wherein at least one of said first partial converter and said second partial converter are in each case modular multi-level converters, which have converter arms having a series circuit composed of two-pole sub modules, wherein each sub module is equipped with at least one energy storage device and power semiconductor switches; and wherein each said sub module is at least one of a full-bridge circuit, a double-module circuit, or a half-bridge circuit.

2. The DC-to-DC voltage converter according to claim 1, wherein each of said first and second partial converters forms an AC voltage connection and said power exchange device connects said AC voltage connection of said first partial converter to said AC voltage connection of said second partial converter.

3. The DC-to-DC voltage converter according to claim 2, wherein said power exchange device is a transformer.

4. The DC-to-DC voltage converter according to claim 3, wherein said transformer has a primary winding connected to said AC voltage connection of said first partial converter and a secondary winding connected to said AC voltage connection of said second partial converter.

5. The DC-to-DC voltage converter according to claim 1, wherein each one of said first and second partial converters has at least one phase module that forms two series-connected converters, and a potential point between said converter arms of a respective said phase module forms an AC voltage phase of an AC voltage connection.

6. The DC-to-DC voltage converter according to claim 5, wherein each one of said first and second partial converters has three phase modules and AC voltage connections of said phase modules are coupled to one another via a three-phase transformer.

7. The DC-to-DC voltage converter according to claim 5, wherein at least one of said first and second partial converters forms two phase modules and the AC voltage connection of said phase modules is coupled to the AC voltage connection of a respectively other said partial converter via a single-phase transformer.

8. The DC-to-DC voltage converter according to claim 5, wherein each said partial converter or at least one of said first and second partial converters has only one phase module with the AC voltage phase assigned to a capacitor auxiliary phase, the capacitor auxiliary phase is connected to a DC voltage terminal of the first or second DC voltage connection via a capacitor, and wherein the AC voltage phase and the capacitor auxiliary phase assigned thereto are connected to one another via a winding of a single-phase transformer.

9. The DC-to-DC voltage converter according to claim 1, wherein each converter arm of said first partial converter includes bidirectionally blocking sub modules and sub modules with half-bridge circuits.

10. The DC-to-DC voltage converter according to claim 1, wherein said second partial converter exclusively has sub modules with half-bridge circuits, wherein a translation ratio between the first DC voltage connection and the second DC voltage connection is greater than or equal to 2.

11. The DC-to-DC voltage converter according to claim 1, wherein a number ($n_{vB}$) of bidirectionally blocking sub modules is given by $$n_{VB} = \frac{U_{DC2}}{2 U_m},$$

wherein $U_{DC2}$ is a nominal voltage of the second DC voltage grid and Um is a voltage dropping across the energy storage device of the bidirectionally blocking sub module.

12. The DC-to-DC voltage converter according to claim 11, wherein a number ($n_{HB}$) of sub modules with half-bridge circuits in each converter arm of the first partial converter is given according to the equation $$n_{HB} = \frac{U_{DC1}}{U_m} \left( \frac{2\ddot{u} - 3}{2\ddot{u}} \right),$$

wherein $U_{DC1}$ is the nominal voltage of the DC voltage grid present at the first DC voltage connection and üis the translation ratio of the DC-to-DC voltage converter.

13. The DC-to-DC voltage converter according to claim 1, wherein said power exchange device has an autotransformer connected to said first and second partial converters via devices for isolating DC voltage potentials.

14. The DC-to-DC voltage converter according to claim 1, wherein a dielectric strength of said converter series circuit formed of said first and second partial converters is geater than a dielectric strength of a single partial converter of said converter series circuit.

15. A DC-to-DC voltage converter for connecting HVDC grids having different voltages, the DC-to-DC voltage converter comprising:

a first partial converter and a second partial converter connected in series with one another to form a converter series circuit;

said converter series circuit extending between DC voltage terminals of a first DC voltage connection and said second partial converter extending between DC voltage terminals of a second DC voltage connection; and a power exchange device connecting said first partial converter and said second partial converter to one another for enabling an exchange of electric power between said first partial converter and said second partial converter via said power exchange device;

wherein at least one of said first and second partial converters is a self-commutated converter having a power semiconductor switch to be selectively switched on and off;

wherein at least one of said first partial converter and said second partial converter are in each case modular multi-level converters, which have converter arms having a series circuit composed of two-pole sub modules;

wherein each sub module is equipped with at least one energy storage device and power semiconductor switches, and each said sub module is a full-bridge circuit, a double-module circuit, or a half-bridge circuit; and wherein a number ($n_{vB}$) of bidirectionally blocking sub modules is given by $$n_{VB} = \frac{U_{DC2}}{2 U_m},$$

wherein $U_{DC2}$ is a nominal voltage of the second DC voltage grid and Um is a voltage dropping across the energy storage device of the bidirectionally blocking sub module.

16. The DC-to-DC voltage converter according to claim 15, wherein a number ($n_{HB}$) of sub modules with half-bridge circuits in each converter arm of said first partial converter is given according to the equation $$n_{HB} = \frac{U_{DC1}}{U_m}\left(\frac{2\ddot{u}-3}{2\ddot{u}}\right),$$

wherein $U_{DC1}$ is the nominal voltage of the DC voltage grid present at the first DC voltage connection and U is the translation ratio of the DC-to-DC voltage converter.

* * * * *